(12) United States Patent
Zavattari et al.

(10) Patent No.: US 6,231,628 B1
(45) Date of Patent: May 15, 2001

(54) METHOD FOR THE SEPARATION, REGENERATION AND REUSE OF AN EXHAUSTED GLYCOL-BASED SLURRY

(75) Inventors: Carlo Zavattari, Varallo Pombia; Guido Fragiacomo, Novara, both of (IT)

(73) Assignee: MEMC Electronic Materials, Inc., St. Peters, MO (US)

( * ) Notice: Subject to any disclaimer, the term of this patent is extended or adjusted under 35 U.S.C. 154(b) by 0 days.

(21) Appl. No.: 09/345,934

(22) Filed: Jul. 1, 1999

(30) Foreign Application Priority Data

Jan. 7, 1998 (IT) .............................................. RM98A0439
Apr. 5, 1999 (EP) .................................................. 99830266

(51) Int. Cl.$^7$ .................................................. B01D 21/01
(52) U.S. Cl. ................................ 51/293; 51/307; 51/309; 210/651; 210/712; 210/737; 210/774; 210/781; 210/787
(58) Field of Search ............................ 51/293, 307, 309; 210/651, 712, 737, 774, 781, 787

(56) References Cited

U.S. PATENT DOCUMENTS

| | | | | |
|---|---|---|---|---|
| 4,033,866 | * | 7/1977 | Enzmann | 210/83 |
| 4,191,159 | | 3/1980 | Collins | 125/21 |
| 4,751,006 | | 6/1988 | Becker | 210/774 |
| 5,664,990 | | 9/1997 | Adams et al. | 451/60 |
| 6,001,265 | * | 12/1999 | Toyama et al. | 210/712 |

FOREIGN PATENT DOCUMENTS

| | | |
|---|---|---|
| 44 05 829 | 8/1995 | (DE) . |
| 0147541 | 7/1985 | (EP) . |
| 0 826 459 | 8/1995 | (EP) . |
| 0786317 | 1/1997 | (EP) . |
| 0791385 | 2/1997 | (EP) . |
| 2017517 | 2/1979 | (GB) . |
| 0515011 | 11/1992 | (GB) . |

OTHER PUBLICATIONS

Perry, R., "Chemical Engineers' Handbook, Fifth Edition" 1973, p. 19–57 p. 19–59 (No Month).
Kirk–Othmer, "Encyclopedia of Chemical Technology, Third Edition, vol. 10" 1980, p. 284–p. 297. (No Month).
Dr. O–A Neumüller: "Römpps Chemi–Lexikon", 1987, Franckh'Sche Verlagshandlung, Stuttgart XP002118697, p. 3521–p. 3522 (No Month).

* cited by examiner

Primary Examiner—Michael Marcheschi
(74) Attorney, Agent, or Firm—Senniger, Powers, Leavitt & Roedel

(57) ABSTRACT

A method of separating, recovering and reusing components of an exhausted slurry used in slicing silicon wafers from a silicon ingot. In the method, the viscosity of the exhausted slurry is reduced and the lubricating fluid component of the slurry is separated from solids and collected, the collected lubricating fluid component being suitable for reuse in the preparation of a fresh slurry without any additional separation steps being necessary. Additionally, the separated solids may be collected and further separated into an unspent abrasive grain component, which is suitable for reused in the preparation of a fresh slurry, and a waste product containing silicon particulate and spent abrasive grains.

20 Claims, 1 Drawing Sheet

METHOD FOR THE SEPARATION, REGENERATION AND REUSE OF AN EXHAUSTED GLYCOL-BASED SLURRY

REFERENCE TO RELATED APPLICATION

This application claims priority under 35 U.S.C. 119 from Italian application, Serial No. RM98 A000439, filed on Jul. 1, 1998.

BACKGROUND OF THE INVENTION

The present invention relates generally to a method for the regeneration of an abrasive slurry utilized in the preparation of silicon wafers. More particularly, the present invention relates to a method of separating components of an exhausted slurry, used in slicing wafers from a single crystal or polycrystalline silicon ingot, such that the desirable abrasive grains and lubricating or cooling fluid therein can be reused.

Silicon wafers are obtained from a single crystal or polycrystalline silicon ingot by first slicing the ingot in a direction normal to its axis. Typically, the slicing operation is accomplished by means of a wire saw, wherein the silicon ingot is contacted with a reciprocating wire while a slurry containing abrasive grains is supplied to the contact area between the ingot and the wire. Conventional wire saw slurries typically comprise a lubricating or cooling fluid such as, for example, mineral oil or some water soluble liquid (e.g., polyethylene glycol, or "PEG"), and abrasive grains, such as silicon carbide.

During the slicing operation, silicon particulate are formed which become incorporated into the slurry. As the concentration of the silicon particulate in the slurry increases, the efficiency of the slicing operation decreases. Eventually, the slurry becomes ineffective, or "exhausted," and must be discarded. Typically, the exhausted slurry is disposed of by incineration or treated by a waste water treatment facility. However, burning this slurry may generate carbon dioxide, while sending this slurry to a waste water treatment facility generally results in the formation of a sludge which must be disposed of in a landfill. Accordingly, both approaches of disposal are unfavorable from an environmental point of view. It is therefore desirable to eliminate, or significantly reduce the amount of, this waste which is generated.

In addition to the negative environmental consequences and the costs associated with the disposal of the exhausted slurry, silicon wafer production costs are also increased due to the fact that the slurry is generally disposed of prematurely. More specifically, the rate at which the abrasive grains in the slurry are "spent" (i.e., worn to a size too small for effective slicing) by the slicing operation is generally much less than the rate at which the slurry becomes contaminated by silicon particulate. Furthermore, the useful life of a typical lubricating or cooling fluid is dictated almost entirely by the build-up of silicon particulate; that is, the lubricating or cooling solution could be used for a much longer period of time, if it were not for the increasing concentration of silicon particulate in the slurry. As a result, the slurry is typically discarded once the level of silicon particulate in the slurry is too high, even though much of the abrasive grains and lubricating or cooling fluid are still usable.

In view of the foregoing, a need continues to exist for a method which may be utilized to separate silicon particulate from the slurry, thus enabling the reuse of abrasive grains and the lubricating or cooling fluid. Such a process would reduce the manufacturing costs associated with the slicing of silicon ingots. In addition, such a process would reduce the amount of waste product and/or waste byproduct emitted into the environment.

SUMMARY OF THE INVENTION

Among the several objects and features of the present invention may be noted the provision of a method for extending the useful life of the components of a slurry utilized in slicing a silicon ingot; the provision of such a method wherein these components are regenerated by separating them from an exhausted slurry; the provision of such a method wherein the lubricating or cooling fluid may be efficiently regenerated by separating it from solids in the slurry; the provision of such a method wherein abrasive grains may be regenerated by separating them from silicon particulate, spent grains and other particulate contaminants in the slurry; the provision of such a method wherein the regenerated lubricating or cooling fluid and the regenerated abrasive grains are reintroduced into the silicon wafer manufacturing process; the provision of such a method wherein the amount of waste which must be discarded is decreased; and, the provision of such a method wherein the cost of producing silicon wafers is reduced.

Briefly, therefore, the present invention is directed to a method for treating an exhausted slurry utilized in slicing silicon wafers from a silicon ingot, the slurry comprising an abrasive grain component and a lubricating fluid component, such that at least one of the components may be recovered and reused in preparing a fresh slurry. The method comprises heating the exhausted slurry to reduce the viscosity, and then separating the heated slurry into a liquid fraction and a solids fraction. The liquid fraction, which comprises the lubricating fluid component, is collected and reused in the preparation of a fresh slurry without further separation.

The present invention is further directed to a method for treating an exhausted slurry utilized in slicing silicon wafers from a silicon ingot, the slurry comprising an abrasive grain component and a lubricating fluid component, such that at least one of the components may be recovered and reused in preparing a fresh slurry. The method comprises heating the exhausted slurry to reduce viscosity and separating the heated slurry into a liquid fraction and a solids fraction, the solids fraction comprising silicon particulate and the abrasive grain component, the abrasive grain component further comprising a spent abrasive grain component fraction and an unspent abrasive grain component fraction. The solids component is mixed with water to form a solid/liquid mixture, which is then separated into a waste product fraction and a recycle fraction, the waste fraction comprising silicon particulate and a spent abrasive grain component fraction, the recycle fraction comprising the unspent abrasive grain component fraction. The unspent abrasive grain component fraction is then isolated from the recycle fraction for reuse in the preparation of a fresh slurry.

Other objects and features of the present invention will be in part apparent and in part pointed out hereinafter.

DETAILED DESCRIPTION OF THE INVENTION

Figure 1:
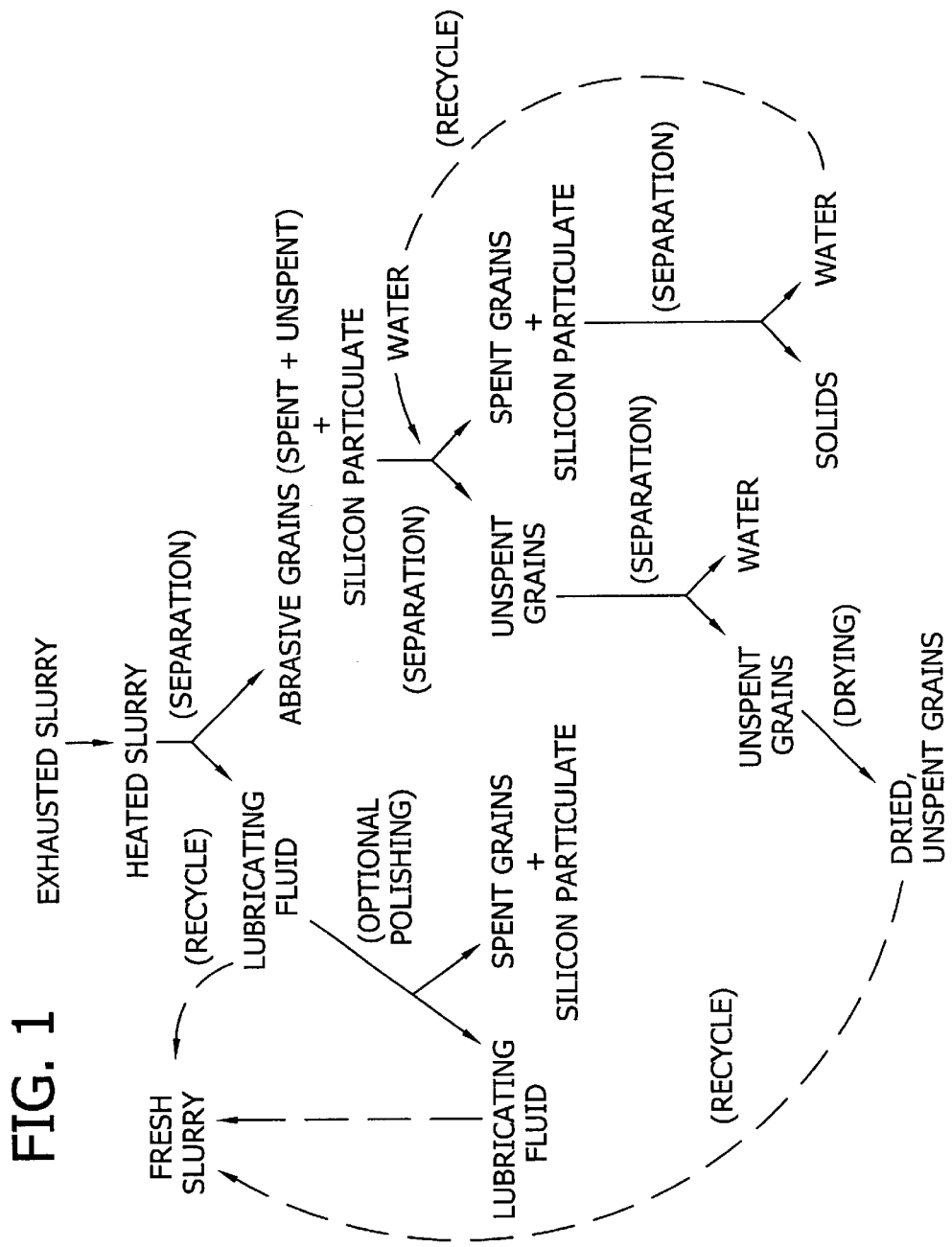
FIG. 1 is a flow chart which details an example of the steps, some of which are optional, that may be employed in accordance with the present invention to isolate components suitable for reuse in a slurry used in slicing a silicon ingot.

In order to reduce the amount of waste generated by standard silicon wafer production processes, as well as reduce the costs associated with silicon wafer production in general, it is desirable to regenerate or recycle the exhausted abrasive slurry used in slicing the silicon ingots from which the wafers are obtained. More specifically, it is desirable to isolate those components of the slurry (i.e., the cooling or lubricating fluid and the unspent abrasive grains) which are still suitable for purposes of slicing an ingot from the remainder of the slurry and using them to prepare fresh slurries.

It is to be noted that, as used herein, the following phrases or terms shall have the given meanings: "exhausted slurry" refers to a slurry which is essentially no longer suitable for purposes of slicing silicon wafers from a silicon ingot as a result of, for example, an unacceptably high viscosity or concentration of silicon particulate; "spent abrasive grains" refers to abrasive grains which, as a result of being worn down by the slicing process, are of a diameter or size which is generally no longer suitable for purposes of slicing silicon wafers from a silicon ingot; "unspent abrasive grains" refers to abrasive grains in the exhausted slurry which are still suitable for purposes of slicing silicon wafers from a silicon ingot; and, "viscosity" refers to the dynamic viscosity of the slurry, which is the viscosity as determined or measured while the slurry is in flow, by means common in the art.

As noted above, the viscosity of the slicing slurry increases during use, typically reaching a viscosity of about 700 cps (centipoise) or more at about 20° C., at least in part because of the build-up of particulate matter, such as silicon particulate, in the slurry. The high viscosity of the exhausted slurry prevents easy separation of the particulate contaminants from the underlying lubricating or cooling fluid and the abrasive grains not spent by the slicing process, thus complicating any attempts to isolate, recover and reuse these slurry components.

The method of the present invention addresses these problems and provides the means by which to easily and efficiently separate the waste solids (i.e., silicon particulate and spent abrasive grains) from those slurry components which may be reused (i.e., the lubricating or cooling fluid and the unspent abrasive grains). Referring generally to FIG. 1, in accordance with the present method the viscosity of the exhausted slurry is first decreased to a level which allows for the separation of essentially all solid matter (i.e., both the waste solids as well as the unspent abrasive grains) from the lubricating or cooling fluid. The viscosity of the exhausted slurry is decreased by heating the slurry, the precise temperature to which the slurry is heated being at least in part a function of the composition of the slurry. For example, typically a polyethylene glycol-based lubricating or cooling fluid will be used as the "suspending medium" for the slurry. In such instances, the exhausted "glycol" slurry is typically heated to a temperature of at least about 50° C., more preferably at least about 75° C., and still more preferably at least about 100° C. Most preferably, the slurry is heated to a temperature just below the boiling point, or alternatively the temperature at which degradation begins, of the glycol-based fluid. Although the slurry may be further processed once the desired temperature has been reached, typically the temperature will be held for about 10, 20, 30 minutes or more. Furthermore, to aid in heat transfer, agitation may optionally be used to speed the heating process.

It is to be noted that the temperature to which the slurry is heated can be other than herein described without departed from the process of the present invention. For example, generally speaking, it is most preferable to heat the slurry to a temperature just below the boiling point, or degradation temperature, of the particular lubricating or cooling fluid, which will enable the most efficient and essentially complete separation of the fluid from the solid matter. However, the equipment used to contain, transfer and separate the fluid from the solids, or vice versa, may not be capable of withstanding such temperatures, in which case the temperature must be reduced or alternative equipment employed.

It is to be further noted that, in the preferred embodiment, the slurry is heated directly; that is, the slurry is not diluted with water or some other solvent prior to heating. Such an approach is preferred because, upon separation of the underlying fluid from the solid matter, the fluid is suitable for reuse in the ingot slicing slurry without further separation or processing. However, the viscosity of the slurry may alternatively be reduced by, for example, the addition of water or some other appropriate solvent (such as methanol for a glycol-based slurry). If the slurry is to be diluted in this way to reduce viscosity, heat may still be applied, either to the diluted slurry directly or by first heating the solvent to be added. However, when a solvent is utilized, typically the resulting lubricating or cooling fluid must be concentration (by distillation, for example), prior to it being reused in the ingot slicing slurry.

Experience to-date suggests that once the viscosity of the exhausted slurry is reduced to about 200 cps or less (at a temperature between about 50° C. to about 80° C., as determined by means common in the art for measuring dynamic viscosity), the solid matter can be separated from the underlying lubricating or cooling fluid. Preferably, the viscosity of the exhausted slurry is reduced to about 50 to about 200 cps. More preferably, the viscosity of the exhausted slurry is reduced to about 55 to about 150 cps. Still more preferably, the viscosity of the exhausted slurry is reduced to about 60 to about 100 cps, while even more preferably the viscosity is reduced to about 70 to about 80 cps. Most preferably, the viscosity will be reduced to a level which enables the most efficient and essentially complete separation of the fluid from the solid matter.

Following the reduction of slurry viscosity, the solid matter in the slurry is separated from the lubricating or cooling fluid. Any method for separating solids of a very small diameter (i.e., about 5 microns, 3 microns, 1 micron, or even less) may be used, provided it is capable of withstanding the temperature to which the slurry has been heated. Preferably however, the method employed will be one which yields solids that are generally dry; that is, a method which requires no further separations in order to remove essentially all of the fluid. Filtration of the hot slurry, and more preferably vacuum filtration, is an example of the method to employ to separate the solid matter from the underlying fluid.

Filtration generally involves separating the hot slurry into a liquid component and a solids component by passing the hot slurry through at least one screen, such as a polypropylene screen, having a pore or mesh size which is sufficient to remove substantially all of the solids from the fluid. For example, typically a screen having a pore or mesh size of less than about 5 microns, preferably less than about 3 microns, and more preferably less than about 1 micron, is used for vacuum filtration.

In accordance with the present method, the filtrate, or liquid fraction, resulting from the separation may be directly recycled into the silicon wafer manufacturing process, for use as the lubricating or cooling fluid of the silicon ingot slicing slurry without any additional separation or processing steps being performed. However, if the viscosity of the filtrate is not within the preferred range of about 80 cps to about 100 cps at about 25° C., additional steps can be utilized. For example, if desired, an optional "polishing" or "clarification" step may be performed, wherein the liquid fraction is subjected to an additional separation step in order to remove very small, or fine, particles. Also, if a solvent was added to reduce the exhausted slurry viscosity, as noted above, the liquid component may require concentration, such as for example by distillation, in order to obtain the lubricating or cooling fluid prior to reuse.

The solids fraction resulting from the separation is further processed, in order to isolated unspent abrasive grains (i.e., grains having diameters which were not previously reduced too much by the slicing process) from silicon particulate and spent abrasive grains (i.e., grains which have been worn down by the slicing process to a diameter which is too small for further use). To facilitate the isolation of those abrasive grains which are suitable for reuse, the solids fraction from the initial separation are diluted in a liquid, such as water, which is capable of allowing the formation of two different solid suspensions. More specifically, the solids fraction is mixed with a liquid, such as water, in order to form one suspension containing the unspent abrasive grains of, for example, silicon carbide, and a second suspension containing silicon particulate and spent abrasive grains, as well as other particulate contaminants which may be present.

Typically, water is added to the solids fraction until the solids content is about 10 to about 100 g/L (grams/liter), preferably about 15 to about 50 g/L, and most preferably about 20 to about 30 g/L. Additionally, this solid/liquid mixture may be agitated by means common in the art (such as, for example, a rotating blade-type mixer, ultrasound, recirculation, or gas bubbling/injection) to further aid in the separation of the desirable solids (i.e., the abrasive grains) from the undesirable solids (i.e., the silicon particulate and spent abrasive grains), and the formation of two respective suspensions.

This solid/liquid mixture is then separated into two suspensions, the first containing relatively heavy or large particles and the second containing relatively light or small particles. The separation can be accomplished by any means common in the art which is capable of separating particles based on weight or size, such as, for example, a cyclone separator, a sedimentation centrifuge, a filtration centrifuge or a filter (in conjunction with a filter cloth having the appropriate pore size for the necessary selectivity). Preferably, however, this separation is accomplished by means of a cyclone separator, which is preferred due to its relatively low cost and durability (see, e.g., model number RWK810 by AKW of Germany).

Generally speaking, in a cyclone separator, a liquid containing solid particles weighing less than a predetermined amount is discharged from an upper outlet while a liquid containing particles equal to or heavier than the predetermined weight is discharged from a lower outlet. In the present invention, the predetermined weight corresponds to particles of a size which allows separation of the reusable abrasive grains from the silicon particulate and the spent grains, which have a much smaller diameter relative to the abrasive grains. Accordingly, after the solid/liquid mixture has been separated, two suspensions remain. The first suspension comprises the abrasive grains which are suitable for reuse in a silicon ingot slicing slurry, while the second suspension comprises silicon particulate and spent abrasive grains.

The first suspension is further process, wherein the liquid is removed, in order to obtain the abrasive grains for reuse in the wafer manufacturing process. The abrasive grains may be isolated from this first suspension by means common in the art, such as by filtration or centrifugation. This further concentration is preferable if, for example, the abrasive grains are to be dried because removing the excess liquid acts to reduce drying time. Drying may be performed by any means common in the art, such as by placing the filtered solids in a vacuum oven. It is preferable that the collected grains be periodically moved during the drying process, however, due to the tendency of silicon carbide abrasive grains to form relatively large masses of solidified material.

It is to be noted that when heat is applied to dry the abrasive grains it is preferable to use a temperature which is as high as possible (i.e., a temperature which will dry the solids as quickly as possible) without causing a reaction to occur between any residual silicon particulate and oxygen present, to form silicon oxide. Accordingly, preferably the abrasive grains will be dried at a temperature between about 75° C. and about 200° C., and more preferably between about 100° C. and about 150° C. Although the drying time may vary, depending upon, for example, the liquid being removed and the method of drying, typically drying will continue until only a trace amount, or less, of the liquid remains. For example, if water is used to form the solid/liquid mixture, typically the abrasive solids will be dried until the water content is less than about 5000 ppm (parts per million), preferably less than about 1000 ppm, and most preferably less than about 500 ppm, as determined by means common in the art (such as by the Karl Fischer method).

A low water content is desirable because the presence of water acts to decrease the viscosity of the resulting slurry in which the recovered abrasive grains are used. Water also acts to hinder the ability of the slurry to maintain the solids in a suspended state. Furthermore, the presence of water in the slurry can cause the abrasive grains, such as silicon carbide, to stick together, resulting in the formation of larger abrasive grains which can damage the surface of the wafer during the slicing process.

It is to be further noted that, upon separation of the solid/liquid mixture into two separate suspensions, some of the silicon particulate may still be present in the first suspension; that is, some small quantity of silicon particulate may be present with the abrasive grains which are to be recycled. Without being held to any particular theory, the presence of silicon particulate may be due to the fact that, depending upon the type of separation means employed, some of the silicon particulate is at least as heavy as the predetermined separation weight (if, for example, cyclonic separation is utilized). Alternatively, some of the silicon particulate may have been attached to the surface of the larger abrasive grains. Typically, however, the quantity of silicon particulate in the abrasive grains, such as silicon carbide, is less than about 2 weight percent, preferably less than about 1 weight percent, and most preferably less than about 0.5 weight percent.

The second suspension (i.e., the suspension containing the silicon particulate and the spent abrasive grains), may be discarded. Preferably, however, the suspension will be concentrated and the liquid, such as water, will be collected and reused in the preparation of other solid/liquid mixtures, in order to reduce the amount of waste generated. The suspended solids may optionally be collected and dried, as well.

The method of the present invention affords the means by which to isolate components (i.e., the abrasive grains and the lubricating or cooling fluid) of a slurry used in slicing silicon wafers from a silicon ingot in such a way that they may be used in the preparation of a new slurry. Stated another way, the method of the present invention enables the regeneration of a slurry used in the slicing of silicon ingots. The present method is therefore advantageous because it acts to limit the amount of waste that would otherwise be produced, thus limiting the overall cost associated with the production of silicon wafers. Such advantages are achieved because the recovered lubricating fluid and unspent abrasive grains are reused and the liquid (such as water) which is used in the separation of solids is recycled and repeatedly used, as well. Accordingly, essentially only spent abrasive grains and silicon particulate are discarded, unless of course some other use for these is identified.

Furthermore, the present method yields components which may be used to prepare a slurry that provides results which are equal to, or great than, a slurry prepared from new components. Referring now to Table I, below, it is to be noted that the results of warp measurements for a "regenerated" slurry of silicon carbide and polyethylene glycol versus a new slurry of the same composition are about equal, while the results for total thickness variation (TTV) and surface roughness measurements indicate that the "regenerated" slurry is better (averaged results, in microns ($\mu$m), reported for an equal number of wafer slices, the same process parameters being employed for each slurry).

TABLE I

| Slurry Type | TTV ($\mu$m) | Warp ($\mu$m) | Roughness ($\mu$m) |
| --- | --- | --- | --- |
| "regenerated" | 11 | 10 | 16 |
| new | 15 | 10 | 20 |

Without being held to any particular theory, it is generally believed that the method of the present invention enables the preparation of an improved slurry for silicon ingot slicing, as compared to a new slurry, due to the fact that the particle size distribution of the "regenerated" abrasive grains, in this case silicon carbide, is better suited for providing a smoother, more uniform surface. More specifically, the regenerated abrasive grains have a particle size distribution wherein there are essential no grains larger than about 50 microns while, in contrast, greater than about 2 percent of the grains of a new slurry exceed about 50 microns (with some grains having sizes of 60, 70, 80 microns or more).

In view of the above, it will be seen that the several objects of the invention are achieved and other advantageous results attained. It is intended that all matter contained in the above description shall be interpreted as illustrative and not in a limiting sense.

What is claimed is:

1. A method for treating an exhausted slurry utilized in slicing silicon wafers from a silicon ingot, the slurry comprising an abrasive grain component and a lubricating fluid component, such that at least one of the components is recovered and reused in preparing a fresh slurry, the method comprising:

heating the exhausted slurry to reduce viscosity;

separating the heated slurry into a liquid fraction and a solids fraction, the liquid fraction comprising the lubricating fluid component; and, collecting the separated liquid fraction and reusing said liquid fraction in the preparation of fresh slurry without further separation.

2. The method as set forth in claim 1 wherein the exhausted slurry is heated to reduce viscosity to a value ranging from about 55 cps to about 150 cps.

3. The method as set forth in claim 1 wherein the lubricating fluid component is polyethylene glycol.

4. The method as set forth in claim 1 wherein the heated slurry is separated into a liquid fraction and a solids fraction by filtration.

5. The method as set forth in claim 1 wherein water is added to the solids fraction to form a solid/liquid mixture, said solids fraction comprising silicon particulate and the abrasive grain component, said abrasive grain component comprising a spent abrasive grain component fraction and an unspent abrasive grain component fraction.

6. The method as set forth in claim 5 wherein water is added to the solids fraction to form a solid/liquid mixture having a total solids content ranging from about 20 to about 30 grams/liter.

7. The method as set forth in claim 5 wherein the solid/liquid mixture is separated into a waste product and a recycle product, said waste product comprising said silicon particulate and said spent abrasive grain component fraction, said recycle product comprising said unspent abrasive grain component fraction.

8. The method as set forth in claim 7 wherein said solid/liquid mixture is separated using a cyclone separator.

9. The method as set forth in claim 7 wherein water is removed from said recycle product, said unspent abrasive grain component fraction being reused in the preparation of fresh slurry.

10. The method as set forth in claim 9 wherein said unspent abrasive grain component fraction has a silicon particulate content of less than about 2 weight percent.

11. A method for treating an exhausted slurry utilized in slicing silicon wafers from a silicon ingot, the slurry comprising an abrasive grain component and a lubricating fluid component, such that at least one of the components is recovered and reused in preparing a fresh slurry, the method comprising:

heating the exhausted slurry to reduce viscosity;

separating the heated slurry into a liquid fraction and a solids fraction, said solids fraction comprising silicon particulate and the abrasive grain component, said abrasive grain component comprising a spent abrasive grain component fraction and an unspent abrasive grain component fraction;

mixing said solids fraction with water to form a solid/liquid mixture;

separating said solid/liquid mixture into a waste product and a recycle product, said waste product comprising said silicon particulate and said spent abrasive grain component fraction, said recycle product comprising said unspent abrasive grain component fraction; and, isolating said unspent abrasive grain component fraction from said recycle product and reusing said unspent abrasive grain component fraction in the preparation of fresh slurry.

12. The method as set forth in claim 11 wherein the exhausted slurry is heated to reduce said slurry viscosity to a value ranging from about 55 cps to about 150 cps.

13. The method as set forth in claim 11 wherein the lubricating fluid component is polyethylene glycol.

14. The method as set forth in claim 11 wherein said solid/liquid mixture has a solids content ranging from about 20 to about 30 grams/liter.

15. The method as set forth in claim 11 wherein said solid/liquid mixture is separated using a cyclone separator.

16. The method as set forth in claim 11 wherein the unspent abrasive grain component fraction is isolated from the recycle product by separating the unspent abrasive grain component fraction from water in the recycle product.

17. The method as set forth in claim 16 wherein after isolation the unspent abrasive grain component fraction is dried to have a residual water content of less than about 1000 ppm.

18. The method as set forth in claim 17 wherein the unspent abrasive grain component fraction contains less than about 2 weight percent silicon particulate.

19. The method as set forth in claim 16 wherein after isolation the unspent abrasive grain component fraction is dried to have a residual water content of less than about 500 ppm.

20. The method as set forth in claim 19 wherein the unspent abrasive grain component fraction contains less than about 2 weight percent silicon particulate.

\* \* \* \* \*